US Patent Number: 4,858,803
Date of Patent: Aug. 22, 1989

Gerber

[54] INVISIBLE MOUNT ROOF RACK
[75] Inventor: Gary A. Gerber, Weston, Conn.
[73] Assignee: Gerber Group, Ltd., Bridgeport, Conn.
[21] Appl. No.: 74,521
[22] Filed: Jul. 16, 1987
[51] Int. Cl.[4] .............................................. B60R 9/04
[52] U.S. Cl. ................................ 22.4/329; 224/309; 224/324
[58] Field of Search .............. 224/309, 314, 315, 320, 224/322, 323, 324, 327, 329, 330, 331; 296/213

[56] References Cited

U.S. PATENT DOCUMENTS

| | | |
|---|---|---|
| 2,807,398 | 9/1957 | Matthews . |
| 3,385,488 | 5/1968 | Bronson . |
| 4,354,625 | 10/1982 | Peoples ................................ 224/329 |
| 4,382,532 | 5/1983 | Pflugfelder . |
| 4,410,211 | 10/1983 | Kloppe . |
| 4,456,158 | 6/1984 | Wertz . |
| 4,473,178 | 9/1984 | Bott .................................... 224/324 |
| 4,627,559 | 12/1986 | Anderson . |
| 4,723,696 | 2/1988 | Stichweh et al. ................... 224/331 |

FOREIGN PATENT DOCUMENTS

| | | |
|---|---|---|
| 2551646 | 6/1977 | Fed. Rep. of Germany . |
| 2908682 | 9/1980 | Fed. Rep. of Germany . |
| 3018424 | 11/1981 | Fed. Rep. of Germany ...... 224/309 |
| 3032099 | 1/1982 | Fed. Rep. of Germany ...... 224/309 |
| 3614740 | 5/1987 | Fed. Rep. of Germany ...... 224/309 |
| 990734 | 4/1950 | France . |
| 1489192 | 6/1966 | France . |
| 8704982 | 8/1987 | PCT Int'l Appl. ................. 224/309 |
| 189332 | 5/1937 | Switzerland ........................ 224/329 |
| 2147860 | 5/1985 | United Kingdom ................ 224/309 |

OTHER PUBLICATIONS

Advertisement for Rola Ski Rack, Rola Roof Racks, West Los Angeles, CA, Jan. 1987.

Primary Examiner—Ernest G. Cusick
Attorney, Agent, or Firm—St. Onge Steward Johnston & Reens

[57] ABSTRACT

A roof rack mounting system for vehicle having concealed drip moldings in mounting plates are riveted to the roof return of a vehicle, on opposite sides of the vehicle underneath a vehicle upper door lip. Each mounting plate has two pins which fit into cups or slots formed on a foot plate. A leg section connects each foot plate to a hollow transverse beam. One leg section is movable and has a screw extending through the leg section and engaging a nut secured to the inside of the transverse beam.

22 Claims, 4 Drawing Sheets

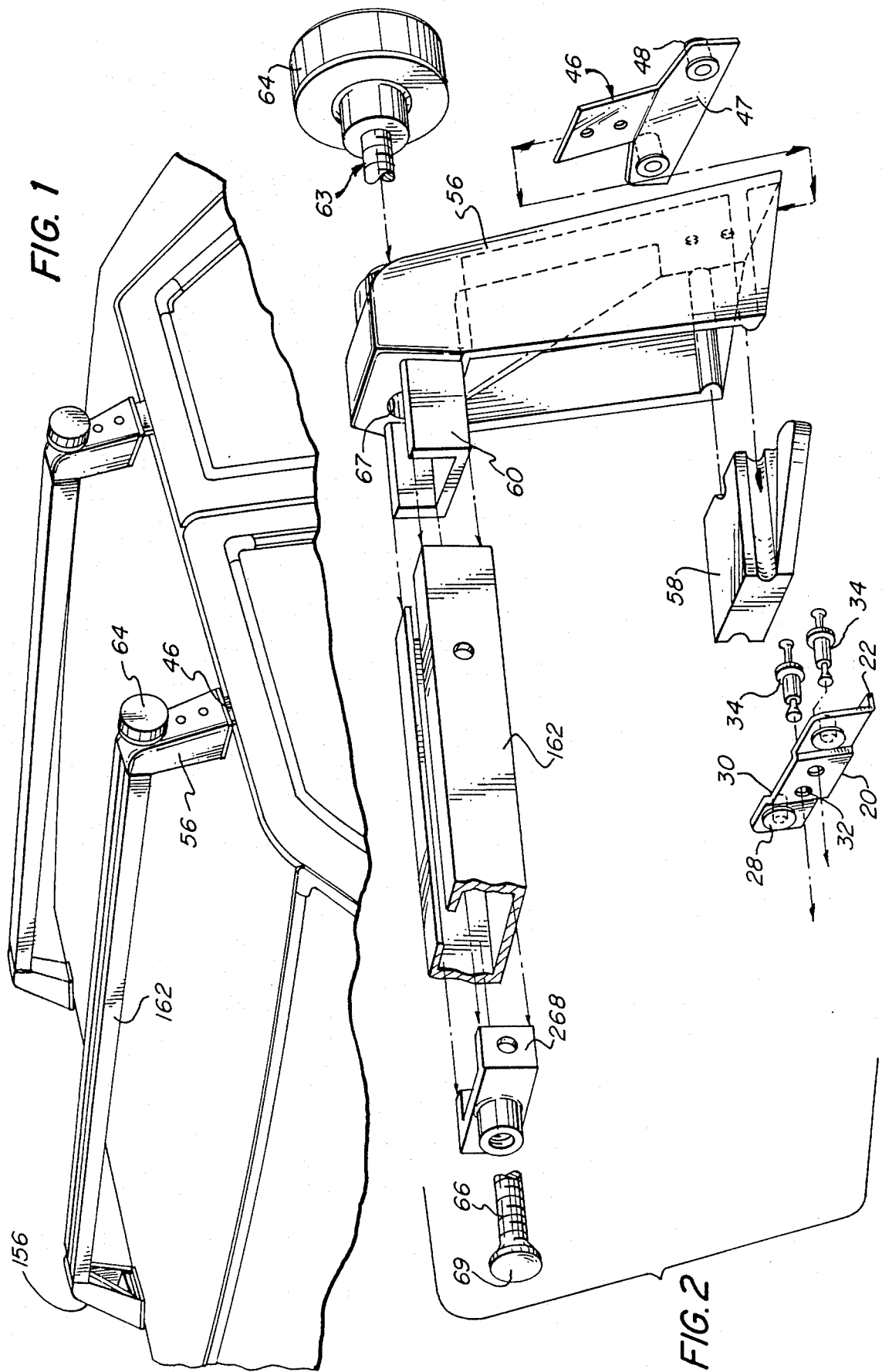

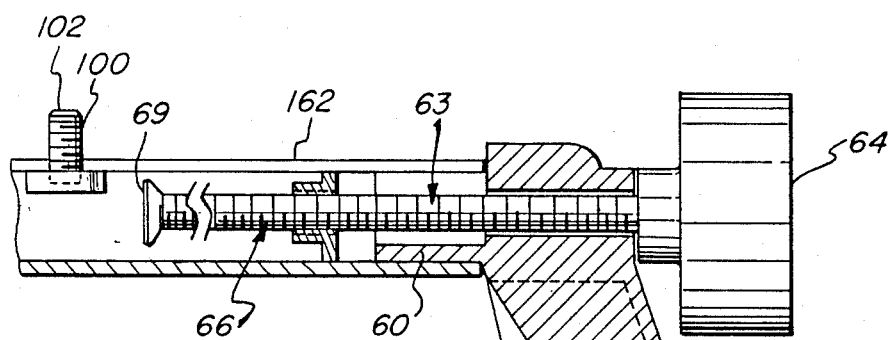
FIG. 3
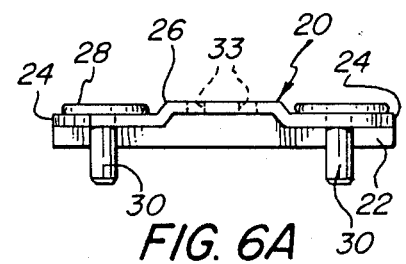
FIG. 6A
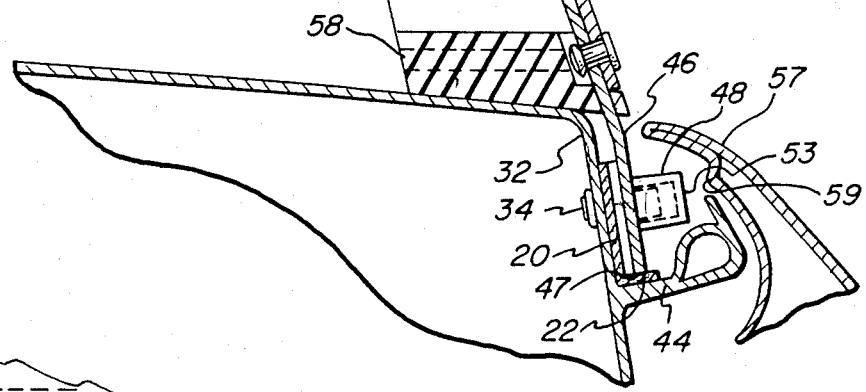
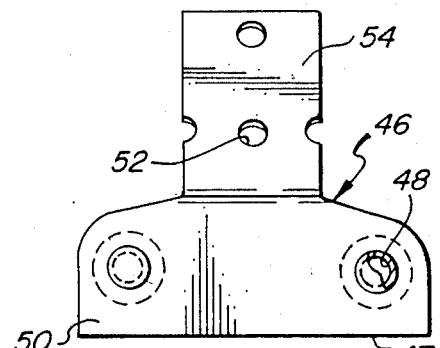
FIG. 4
FIG. 5
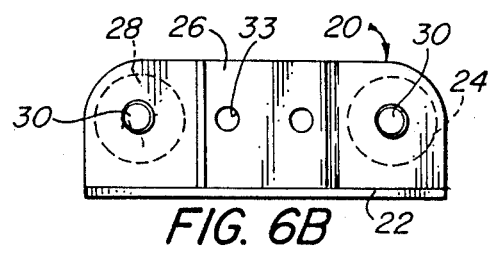
FIG. 6B

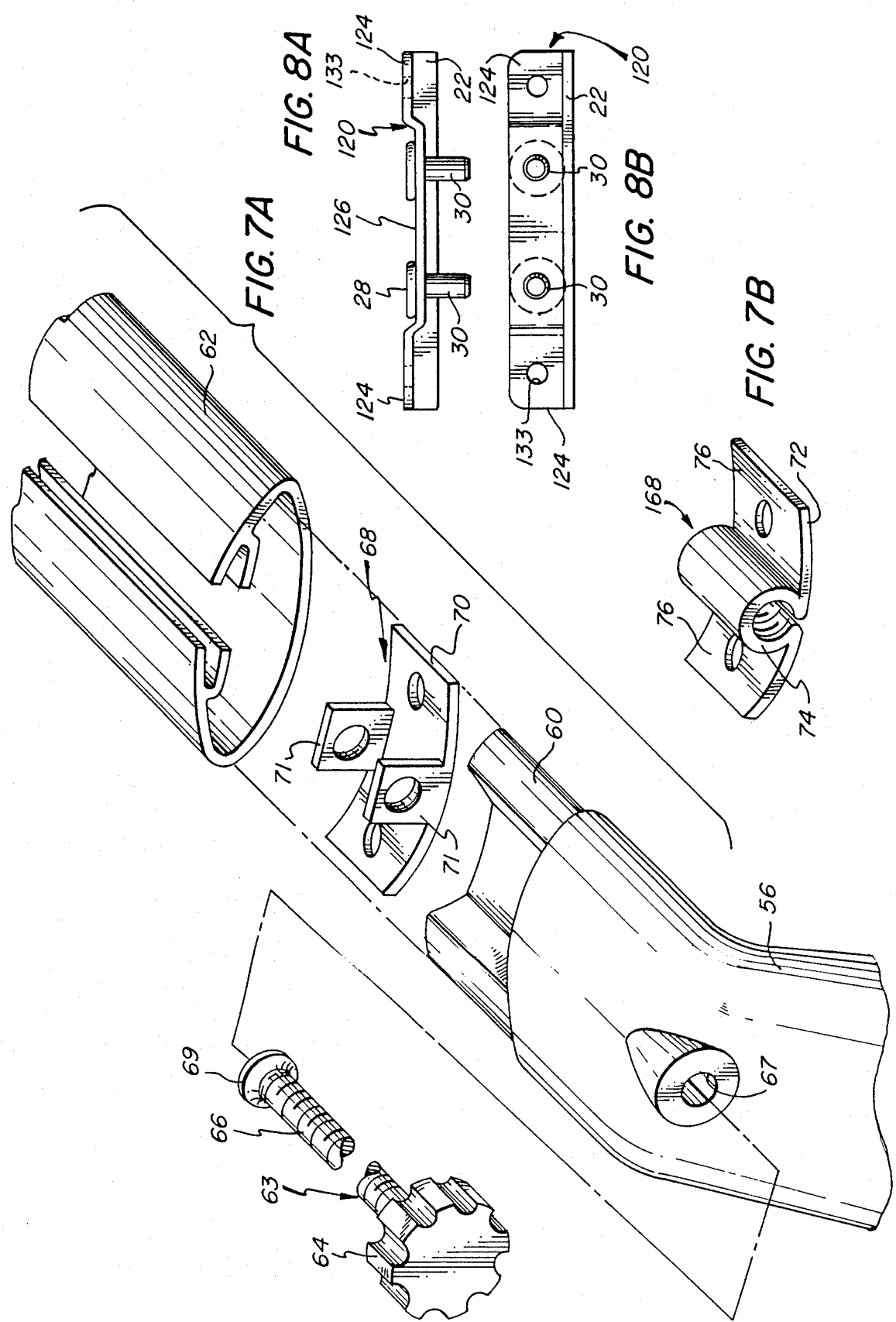

INVISIBLE MOUNT ROOF RACK

FIELD OF THE INVENTION

The present invention relates to an improved roof rack for use with automobiles and other vehicles having concealed drip moldings.

The typical roof rack system has primarily used a clamp of some kind to clamp the leg of a roof rack to the rain gutters of a vehicle. Typical of such devices is U.S. Pat. No. 3,385,488 for a Clamping Device. However, such roof rack systems are ineffective when used to mount a roof rack on a vehicle having a concealed drip molding. Concealed drip moldings, such as the design shown in U.S. Pat. No. 4,410,211 to Kloppe for a Motor Vehicle Body with Concealed Drip Rail, have become a frequently used alternative to rain gutters because the concealed drip molding allows a sleeker vehicle design and improves aerodynamics. However, the concealed drip molding does not provide a convenient and sturdy railing necessary to mount a roof rack using the methods of the prior art.

BACKGROUND ART

Several designs have been proposed to allow the mounting of a roof rack to a vehicle roof. One such design, in the previously mentioned U.S. Pat. No. 4,410,211 to Kloppe discloses a support bracket, having an outwardly extending loop, which is mounted on the roof return of a vehicle roof by screws inserted through the roof return and into a backing plate which is permanently mounted inside the vehicle roof return. A leg of a roof rack is inserted into the loop of the support bracket and a hooked element on the leg engages and presses outwardly against the bracket loop. The disadvantage of the Kloppe design is that the backing plate must be mounted inside the vehicle roof while the vehicle is being manufactured, and is therefore unsuitable for aftermarket use. In addition, the outward force of the hook element when tightened onto the bracket would be likely to unseat a bracket plate which was not securely mounted using a backing plate Another roof rack design which has been adapted for vehicles having concealed drip moldings is U.S. Pat. No. 4,627,559 to Andersson for a Roof Rack for A Vehicle. Andersson discloses a roof rack support system in which holes are drilled into the roof return on each side of a vehicle with a bushing fitted into each hole. The foot of each end of a roof rack has two inwardly directed pins which fit into these holes. The feet are clamped against the vehicle by the action of a turnbuckle mounted in the center of a telescoping beam.

The disadvantage of this design is that the use of holes drilled into sheet metal, even with the disclosed bushings, provides an insecure attachment for the feet of the roof rack. The constant insertion and removal of the pins through the sheet metal of the roof return holes associated with mounting and dismounting the rack will have a tendency to widen the holes, and loosen the bushings, until the holes are to large to retain the pins. A related problem is that a heavy load on the roof rack will tend to distort the sheet metal of the roof return, causinq the holes to widen, and damaqing to the vehicle by allowing water to leak into the body or shell of the vehicle.

In addition, the holes of the Andersson design must be precisely located and drilled so that the pins fit into them.

The prior art thus has not provided a roof rack mounting system which is easily installed as an aftermarket addition, and which provides the strength and security of a factory installed mounting with a backing plate.

DISCLOSURE OF THE INVENTION

In accordance with the present invention, a roof rack section includes a mounting plate secured to each of two lateral edges of a vehicle roof. Each mounting plate has two outwardly protruding pins. Seated on the mounting plate is a foot plate of the roof rack section, which has two cups or slots sized and located to receive the pins.

Attached to each foot plate is a leg section, which is in turn attached to a beam positioned transversely above the vehicle roof. A means for drawing together the transverse beam and the leg sections is provided.

The drawing together means preferably comprises a screw having a knob end located outwardly of the leg section and a shank extending transversely through the leg section and into a hollow interior of the transverse beam, and engaging a threaded nut secured to the inside of said transverse beam.

BRIEF DESCRIPTION OF THE DRAWINGS

FIG. 1 is a perspective view of a roof rack of the present invention mounted on a vehicle roof.

FIG. 2 is an exploded perspective view of a movable end of a roof rack section of the present invention having a square channel embodiment of the transverse beam.

FIG. 3 is a cross-sectional view of a movable end of a roof rack section of the present invention having a square channel embodiment of the transverse beam.

FIG. 4 is a close-up side plan view of a foot plate positioned for mounting on a mounting plate of the present invention.

FIG. 5 is a plan view of a foot plate of the present invention.

FIG. 6A is an elevation view of a first embodiment of the mounting plate of the present invention.

FIG. 6B is a side plan view of a first embodiment of the mounting plate of the present invention.

FIG. 7A is a perspective view of a leg section and a transverse beam of the present invention having an elliptical embodiment of the transverse beam.

FIG. 7B is an omega shaped embodiment of the nut used in the elliptical embodiment of the transverse beam.

FIG. 8A is an elevation view of a second embodiment of the mounting plate of the present invention.

FIG. 8B is a side plan view of a second embodiment of the mounting plate of the present invention.

DESCRIPTION OF THE PREFERRED EMBODIMENT

Figure 9:
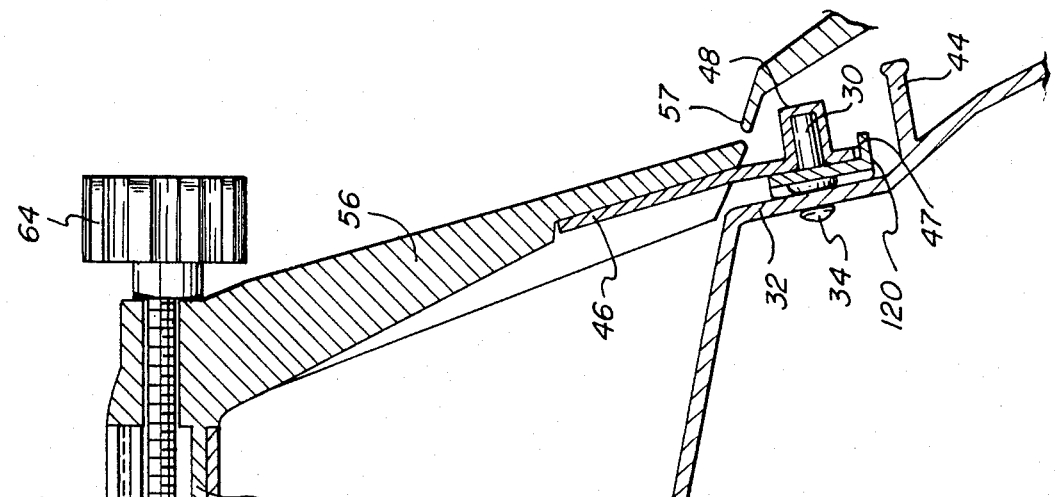
FIG. 9 is a cross sectional view of a movable end of a roof rack section of the present invention having an elliptical embodiment of the transverse beam.

The present invention provides a quickly and easily mounted roof rack.

As used herein a "roof rack section" is one of a plurality of such sections which together form a roof rack. Typically there are two such sections mounted transversely on the front and rear of a vehicle roof.

As illustrated in first and second embodiments in FIGS. 6A, and 6B and 8A and 8B, the mounting plate of the present invention is a rectangular metal plate having a lip 22 along one longitudinal edge. In the first embodiment of the mounting plate 20 shown in FIGS. 6A and 6B the mounting plate is formed so that its ends 24 are in a plane located outwardly from the mounting plate's middle portion 26 when mounted on a vehicle roof return 32 as shown in FIG. 4. The gap between the planes of the inward face of the middle portion 26 of the backing plate and the inward face of the ends 24 allows the head 28 of a pin 30 to be fitted between the mounting plate and a vehicle roof return 32 so that the mounting plate 20 presents a flush inward surface for fastening to a vehicle, as shown in FIGS. 2, 3 and 4. In each mounting plate there are at least two such pins 30. The mounting plate has two openings 33 in its middle portion 26. These openings 33 receive two blind rivets 34, as shown in FIG. 2, which are inserted through the openings 33 and into corresponding openings in the roof return 32 of the motor vehicle to fasten the mounting plate 20 to the motor vehicle.

In a second embodiment of the mounting plate 120 shown in FIGS. 8A, 8B and 9, the pins 30 are located in the middle portion 126 of the mounting plate 120. The middle portion 126 of mounting plate 120 is in a plane located outwardly of the plane of the ends 124 of the mounting plate 120 to allow for the heads 28 of pins 30 to be fitted in the space between the mounting plate 120 and the vehicle roof return 32. Blind rivets are inserted through the openings 133 in the ends 124 of the mounting plate 120 to fasten the mounting plate 120 to the vehicle roof return 32.

The mounting plates 20 or 120 may be used as a template to precisely locate drill holes for the rivets 34.

Typically there will be two pairs of such mounting plates 20 or 120 riveted to the roof return 32 on opposite lateral edges of the vehicle underneath a vehicle door lip 57.

The mounting plate serves to strengthen the roof return 32 to support the roof rack. In the present invention the pins 30 and mounting plates 20 or 120 are intended to support the entire weight of the roof rack section and the articles carried thereon. As shown in FIG. 9 the pins 30 support this load. The invention is not limited to the configurations shown in FIGS. 3 and 4 to a mounting plate having a lip 22 resting on the drip molding 44 for its effectiveness, although the mounting plate may be so located to improve the strength of the roof rack mounting.

As shown in FIGS. 3 and 4 the inward face of a foot plate 46 seats onto the protruding pins 30 of the mounting plate 20 or 120. As shown in FIG. 5, foot plate 46 is provided with outwardly extending cups 48 which are open on their inward facing end; the cups 48 are sized and spaced to receive the pins 30. The lower edge 47 of the foot plate 46 may be supported by the lip 22, as shown in FIGS. 3 and 4, but this is not necessary to the effectiveness of the mounting system, which is designed so that the pins 30 and cups 48 are sufficient to support the roof rack load, as shown in FIG. 9.

The foot plate embodiment 46 shown in FIG. 5 is generally an upside down T-shape, and has the cups 48 located on its horizontal segment 50, and has holes 52 on its vertical segment 54 for fastening to a leg section 56 by rivets or other fastening means. Of course other shapes may be used to serve the same foot plate function within the scope of the invention.

The pins 30 and the cups 48 when fitted together should have a total length less than the clearance between the roof return 32 and the portion of the upper door lip 57 covering the mounting plate 20 or 120 when the door is closed. However, the optimum length is one in which the outward end 53 of the cup 48 just clears the inner surface 59 of the door lip 57 when the door is closed. This length provides security against theft when the doors are closed and locked by preventing the leg section from being backed out from the mounting plate pins 30. The design also prevents accidental dislodgment of the roof rack when the vehicle is traveling at high speeds.

Figure 10:
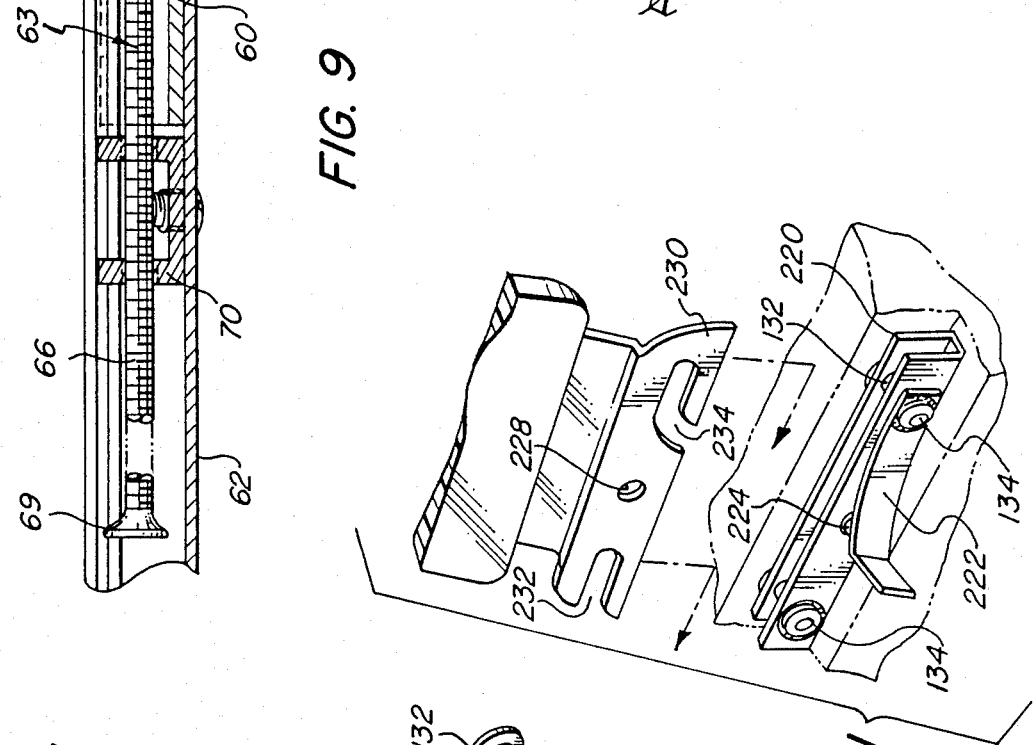
FIG. 10 is an exploded perspective view of a third embodiment of the mounting plate and matching foot plate using a bayonet type mount.
Figure 11:
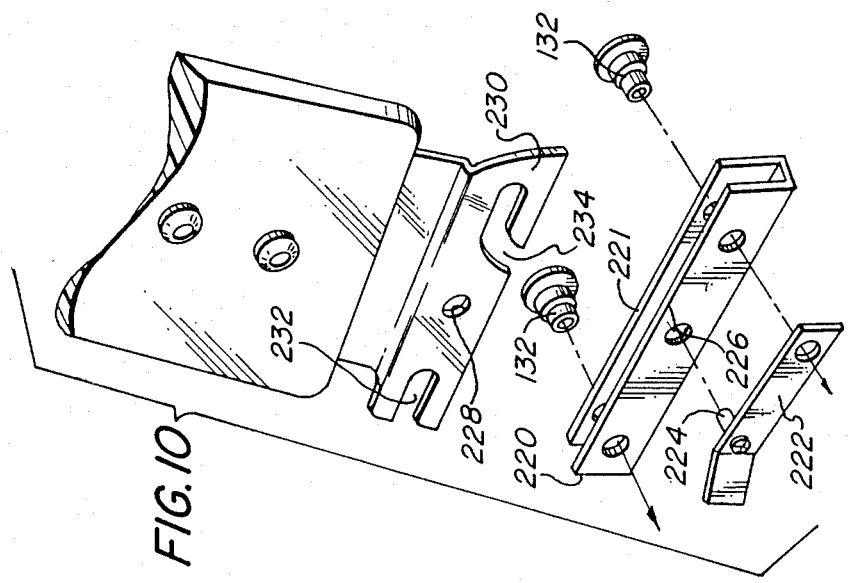
FIG. 11 is a perspective view of the bayonet mounting assembly oriented for mounting.

In the bayonet mount embodiment shown in FIGS. 10 and 11, the third mounting plate embodiment 220 is a generally U-shaped channel fastened to the roof return of a vehicle by tubular securing rivets 132. In the preferred embodiment, the securing rivets 132 traverse the space between the upwardly extending arms 221 of the U-shaped mounting plate 220. Alternatively, other pins may be used in the space between the arms 221.

A spring steel plate 222 is fastened to the mounting plate 220 on its outward surface at one end. The spring steel plate 222 has a locking pin 224 which points inwardly and passes through an opening 226 in the outward side of the mounting plate 220, and into a second opening 228 in the third foot plate embodiment 230 when the foot plate 230 is fitted onto the mounting plate 220.

The foot plate 23 has two slots cut in it. Straight slot 232 is formed with a open end in one side edge of the foot plate 230 and extends parallel to the bottom edge of foot plate 230. Curved slot 234 is formed with an open end at the bottom edge of foot plate 230 and extends upwardly and is curved so that its closed end is parallel to the bottom edge of foot plate 230. Both slots are sized to receive the outer diameter of securing rivets 132.

A roof rack section using the bayonet embodiment is mounted on the car as shown in FIG. 11. The mounting plate assembly 220 is riveted to the roof return 32 of a vehicle by blind rivets 134 that pass through the interior tubular bore of the tubular securing rivets 132. The straight slot 232 is placed in the channel of the mountinq plate assembly 220 in front of one tubular securing rivet 132, and the curved slot 234 is placed onto another tubular securing rivet 132. The foot plate assembly 230 then slides sideways until the securing rivets 132 reach the closed ends of each slot. The pin 224 is inserted into the opening 226 and the opening 228 to prevent accidental disengagement.

The leg section 56 may be provided with a base plate 58 made from a resilient polymeric material to avoid marring or scratching a vehicle's exterior finish, as shown in FIGS. 2 and 3. However, the base plate is not intended to support the roof rack load, and may be omitted to provide a roof rack which is completely supported above the horizontal roof surface, as shown in FIG. 9.

The leg section extends upwardly and may be angled inwardly at approximately 15 degrees. Leg section 56 has an arm 60 which fits into the open end of the hollow transverse beam.

The hollow transverse beam may be a generally rectangular or square channel, shown as 162 in FIGS. 1 and 2, or may be a generally elliptical channel, shown as 62 in FIG. 7A and in FIG. 9. The use of a generally elliptical channel (the term "elliptical" is intended to refer also to other similar shapes, such as ovals, hyperboloids, paraboloids and other streamlined shapes) is preferred because of its superior aerodynamic characteristics. In either case the beam is preferably manufactured from extruded aluminum.

Fitted into the channel of the transverse beam are accessory mounting plates 100 having mounting means for securing accessory hold-downs to the transverse beam. Preferably the mounting means comprises a threaded stud 102 extending upwardly through the open side of the channel beam from the mounting plate 100. The threaded stud fits into threaded sockets in accessories such as ski hold downs, or sailboard holders.

For each embodiment of the roof rack section, one leg section 156 is permanently fastened to one end of the transverse beam 62 or 162, as shown in FIG. 1. The other leg section 56 is movably attached and incorporates means for drawing together the movable leg section 56 and the transverse beam 62 or 162, in order to clamp the foot plates 46 against the mounting plates 20 or 120 to secure the roof rack to the vehicle.

The preferred embodiment of the drawing together means is shown in FIGS. 2 and 3 as a screw 63 extending transversely through the movable leg section 56, with a knob end 64 located outwardly of the leg section. The threaded shank 66 of the screw extends through an aperture 67 in the leg section 56 and engages a nut 68 which is secured to the interior of the transverse beam. The shank end 66 of the screw 63 has a stop 69 to prevent the screw 63 from being withdrawn from the nut.

In the elliptical embodiment of the transverse beam shown in FIGS. 7A and 9, the nut may be either of two alternate embodiments. In one embodiment the nut 68 is a curved piece of metal 70 having a curvature parallel to the curvature of the elliptical channel and having on opposite edges two upright segments 71 in which there are threaded holes to receive the screw 63. In a second embodiment, shown in FIG. 7B as 168, the nut is an omega shaped metal plate 72 threaded in its circular segment 74, and having curved extending segments 76 on either side of the circular segment 74.

In the square channel embodiment 162 of the transverse beam, a square nut 268 may be used to engage the screw 63, as shown in FIG. 2.

The provision for a movable leg section and the drawing together means allows for a sufficient amount of movement so as to clamp the foot plates 46 against the mounting plates, and also allows for loosening the foot plates 46 to dismount the roof rack section. In addition, the movable leg section allows mounting of accessory mounting plates 100 into the channel of the transverse beam.

It should be noted that the described roof rack is provided additional security in that the mounting plates and the foot plates are intended to be located on the roof return area inwards of a portion of the upper lip of a vehicle door. Thus, the roof rack, when mounted in accordance with FIG. 1, is securely held in place by the locked doors of the vehicle, and the mounting parts are inaccessible to vandals and thieves. The present invention thus provides a degree of theft resistance not present in most prior art designs.

What is claimed is:

1. A roof rack section for motor vehicles, said motor vehicles having a roof return on each side of the vehicle roof, said roof return having outwardly extending support pins, comprising:

a hollow transverse channel beam;

leg sections for joining to said transverse channel beam, at least one such leg section and said transverse beam being movable in relation to each other;

foot plates having lower and upper ends, said lower ends having lower edges and side edges, said upper ends being shaped for joining to said leg sections, each said foot plate having a curved slot extending from the lower edge of said foot plate, and each said foot plate having a straight slot extending from one side edge of said foot plate, said slots being shaped to fit into said support pins extending outwardly from said roof returns and to trap said pins, and each said foot plate having an opening for a locking pin therein; and means for drawing together said transverse beam and said movable leg section.

2. A roof rack section in accordance with claim 1, further comprising: mounting plates secured to each said vehicle roof return which have said support pins extending outwardly therefrom, and wherein said support pins have a cross-section sized to fit into said curved and straight slots, and said mounting plate each having an opening therein, and a moveable locking pin located and sized to fit through said mounting plate opening and into said foot plate opening to lock it into place.

3. A roof rack section in accordance with claim 2 wherein said mounting plates are U-shaped in cross-section.

4. A roof rack section in accordance with claim 2 wherein said mounting plates are L-shaped in cross-section.

5. A roof rack section in accordance with claim 1 wherein said transverse beam comprises a channel beam of generally rectangular cross-section.

6. A roof rack section in accordance with claim 1 wherein said transverse beam comprises a channel beam of generally elliptical cross-section.

7. A roof rack section in accordance with claim 1 wherein said drawing together means comprises:

a screw having a knob end located outwardly of said movable leg section and a threaded shank extending transversely through said movable leg section and into said hollow transverse beam; and a threaded nut secured inside and to the transverse beam for receiving said screw.

8. A roof rack section in accordance with claim 1, further comprising an accessory mounting plate, slidably fitted inside said transverse channel beam, having mounting means for securing accessory hold-downs to said transverse channel beam.

9. A roof rack section in accordance with claim 8 wherein said drawing together means comprises:

a screw having a knob end located outwardly of one said leg section and a threaded shank extending transversely through said leg section and into said transverse beam; and a threaded nut secured to the inside of said transverse channel beam for receiving said screw.

10. A roof rack section for motor vehicles having a roof return on each side of a vehicle roof and concealed drip moldings located thereon, comprising:

U-shaped mounting plates secured to each of two lateral edges of a vehicle roof, each said mounting plate having at least two upwardly extending arms and a space therebetween, and having an opening in one said arm, and having tubular securing rivets having an interior bore therein extending through the space between the arms of said U-shaped mounting plates and blind rivets extending through the interior bore of said securing rivets and engaging said roof returns, each said mounting plate having a spring steel arm fastened thereto, said spring steel arm having an inwardly directed locking pin which is sized to fit into said opening in one arm of said mounting plate;

foot plates seated on each said mounting plate, each said foot plate having an upper and lower end, each said lower end having a lower edge and side edges, each said foot plate having a curved slot extending from the lower edge of said foot plate and curving to be parallel with said lower edge, and having a straight slot extending parallel with said lower edge from one side edge of said foot plate, said slots being sized to receive said tubular rivets when said foot plate lower edge is seated in said space between said arms of said mounting plate, and said foot plate having an opening sized and located to receive said inwardly directed pin of said spring steel plate when said foot plate is mounted in said mounting plate;

leg sections attached to each said foot plate at the upper end thereof;

a channel beam positioned transversely above said vehicle roof, said transverse channel beam being attached to said leg sections; and means for drawing together each said foot plate towards the other.

11. A roof rack section for motor vehicles, said motor vehicles having roof returns on sides of a vehicle roof, the roof returns having outwardly extending support pins, comprising:

transverse beam, leg sections for joining to said transverse beam;

foot plates for joining to the leg sections to support the roof rack section, said foot plates having slots sized and located to receive said support pins extending outwardly from said roof returns to trap the foot plates; and releasable locking means adapted to lock the foot plates in their trapped position to prevent the foot plates from sliding and escaping from the support pins;

whereby said roof rack section may be conveniently mounted to said roof return by being located on the support pins and moving said foot plates relative to the roof return until locked in place by said locking means.

12. A roof rack section as claimed in claim 11 further comprising mounting plates affixed to said roof return having said support pins extending outwardly therefrom.

13. A roof rack section in accordance with claim 12 wherein said locking means comprise locking pins, and wherein said foot plates and said mounting plates have openings therein, and wherein said locking pins are spring biased to enter said openings in said foot plates and mounting plates to lock said foot plates in their trapped positions.

14. A roof rack section as claimed in claim 12 wherein said support pins are tubular and have fastener means extending therethrough to affix the mounting plates with the pins to the vehicle roof.

15. A roof rack section as claimed in claim 12 wherein said motor vehicle has closable doors having upper lips and said roof returns are bounded at their lower ends by drip moldings, and which define a concealed space; said mounting plates and support pins being sized sufficiently small so as to fit within said concealed space without interfering with the closure of said doors.

16. A roof rack section in accordance with claim 12 wherein said mounting plates are U-shaped in cross-section.

17. A roof rack section in accordance with claim 12 wherein said mounting plates are L-shaped in cross-section.

18. A roof rack section as claimed in claim 11 wherein at least one of the leg sections and said transverse beam are movable in relation to each other; and further comprising means for drawing said transverse beam and said at least one movable leg section together.

19. A roof rack section in accordance with claim 18 wherein said transverse beam has a hollow segment and wherein said drawing together means comprises:

a screw having a knob end located outwardly of said at least one movable leg section and having a threaded shank extending transversely through said at least one movable leg section and into said hollow segment of said transverse beam; and a threaded nut for receiving said threaded shank secured inside and to said hollow segment.

20. A roof rack section as claimed in claim 11 wherein said foot plates have a lower edge and side edges, and wherein said slots in said foot plates comprise a curved slot extending from the lower edge of said foot plate and another slot extending from a side edge of said foot plate.

21. A roof rack section as claimed in claim 11, further comprising accessory hold down means slidably fitted inside said transverse beam.

22. A roof rack section for motor vehicles, said motor vehicles having roof returns on sides of a vehicle roof, the roof returns having outwardly extending support pins, comprising:

a transverse beam, transverse beam support means having leg sections for joining to said transverse beam at spaced apart locations and having foot portions having slots sized and located to receive said support pins extending outwardly from said roof returns to trap the foot portions to support the transverse beam without placing a load on the roof of the motor vehicle; and releasable locking means adapted to lock the foot portions in their trapped position to prevent the foot portions from sliding and escaping from the support pins;

whereby said roof rack section may be conveniently mounted to said roof return without contacting or placing a load on the vehicle roof by being located on the support pins and moving said foot portions relative to the roof return until locked in place by said locking means.

* * * * *